United States Patent
Hedtke

(10) Patent No.: US 8,387,463 B2
(45) Date of Patent: Mar. 5, 2013

(54) PRESSURE-BASED DIAGNOSTIC SYSTEM FOR PROCESS TRANSMITTER

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 720 days.

(21) Appl. No.: 12/590,361

(22) Filed: Nov. 6, 2009

(65) Prior Publication Data

US 2010/0083731 A1   Apr. 8, 2010

Related U.S. Application Data

(63) Continuation-in-part of application No. 12/287,106, filed on Oct. 6, 2008, now Pat. No. 7,918,134.

(51) Int. Cl.
*G01L 13/02* (2006.01)
*G01L 11/00* (2006.01)

(52) U.S. Cl. ............... 73/716; 73/736; 73/702

(58) Field of Classification Search ............. 73/700–756
See application file for complete search history.

(56) References Cited

U.S. PATENT DOCUMENTS

| | | | |
|---|---|---|---|
| 4,777,826 A | 10/1988 | Rud, Jr. et al. | |
| 4,970,898 A | 11/1990 | Walish et al. | |
| 5,665,899 A | 9/1997 | Willcox | |
| 5,680,109 A | 10/1997 | Lowe et al. | |
| 5,709,337 A | 1/1998 | Moser et al. | |
| 6,295,875 B1 | 10/2001 | Frick et al. | |
| 6,444,487 B1 | 9/2002 | Boggs et al. | |
| 6,484,585 B1 | 11/2002 | Sittler et al. | |
| 6,568,278 B2 | 5/2003 | Nelson et al. | |
| 6,568,279 B2 | 5/2003 | Behm et al. | |
| 6,654,697 B1 | 11/2003 | Eryurek et al. | |
| 7,458,280 B2 | 12/2008 | Wehrs et al. | |
| 2002/0011115 A1* | 1/2002 | Frick ............... | 73/718 |
| 2004/0025594 A1 | 2/2004 | Broden et al. | |
| 2005/0011278 A1 | 1/2005 | Brown et al. | |
| 2005/0016286 A1 | 1/2005 | Broden et al. | |
| 2005/0072239 A1 | 4/2005 | Longsdorf et al. | |
| 2005/0072242 A1 | 4/2005 | Fandrey | |
| 2005/0274417 A1 | 12/2005 | Perry et al. | |
| 2006/0010983 A1 | 1/2006 | Sund et al. | |

(Continued)

FOREIGN PATENT DOCUMENTS

| | | |
|---|---|---|
| JP | 08-35901 | 2/1996 |
| JP | 08-128911 | 5/1996 |

(Continued)

OTHER PUBLICATIONS

"Tracepak Bundles for Instrument Impulse Lines" from: http://www.obcorp.com/webpages/TubingBundles/TXinstru.thm, visited Apr. 30, 2008, 3 pages.

"Advantage of Electric Tracers" from: http://www.obcorp/WebPages/TubingBundles/TXadelec.htm, visited Apr. 30, 2008, 3 pages.

(Continued)

*Primary Examiner* — Andre Allen
(74) *Attorney, Agent, or Firm* — Kinney & Lange, P.A.

(57) ABSTRACT

A process transmitter for measuring a process variable in an industrial process comprises a gauge pressure sensor, an excitation source and transmitter circuitry. The gauge pressure sensor measures a pressure difference between a process fluid and a reference volume, and generates a pressure sensor signal representing the pressure difference. The excitation source generates a pressure pulse within the reference volume to influence generation of the pressure sensor signal. The transmitter circuitry is connected to the gauge pressure sensor to provide an output related to a change in the pressure sensor signal due to the pressure pulse.

39 Claims, 11 Drawing Sheets

U.S. PATENT DOCUMENTS

| | | | |
|---|---|---|---|
| 2007/0068922 A1 | 3/2007 | Westfield et al. | |
| 2007/0089521 A1* | 4/2007 | Mosely et al. | 73/702 |
| 2007/0138909 A1 | 6/2007 | Mortet et al. | |
| 2007/0241916 A1 | 10/2007 | Hedtke | |
| 2007/0270982 A1 | 11/2007 | Foss et al. | |
| 2009/0030634 A1 | 1/2009 | Schumacher | |
| 2009/0043530 A1 | 2/2009 | Sittler et al. | |
| 2010/0083768 A1* | 4/2010 | Hedtke et al. | 73/724 |

FOREIGN PATENT DOCUMENTS

| | | |
|---|---|---|
| JP | 08-166309 | 6/1996 |
| JP | 2004-144491 | 5/2004 |
| JP | 2007-047012 | 2/2007 |

OTHER PUBLICATIONS

"Tracepak and Heated Hose Introduction" from: http:www.obcorp.com/WebPages/TubingBundles/TXHH.htm, visited Apr. 30, 2008, 3 pages.

"O'Brien J-Line Jacketed Tubing" brochure, Feb. 4, 2003, 2 pages.

"O'Brien S-Line Preinsulated Tubing" brochure, Feb. 10, 2007, 1 page.

"O'Brien TRACEPAK" brochure, Nov. 1, 2006, 16 pages.

Official Search Report and Written Opinion in counterpart foreign Application No. PCT/US2009/005360, filed Sep. 29, 2009.

International Search Report and Written Opinion for PCTUS2009/006007.

\* cited by examiner

PRESSURE-BASED DIAGNOSTIC SYSTEM FOR PROCESS TRANSMITTER

CROSS-REFERENCE TO RELATED APPLICATION(S)

This application claims priority as a continuation-in-part under 35 U.S.C. §120 of an earlier filed application entitled "Thermal-Based Diagnostic System For Process Transmitter" by Robert C. Hedtke et al., filed on Oct. 6, 2008 and having Ser. No. 12/287,106, which is assigned to the same assignee as the present application.

BACKGROUND

The present invention relates generally to industrial process transmitters for use in industrial process control systems. More particularly, the present invention relates to diagnostic systems for verifying performance of process transmitters having a gauge pressure sensor.

Process instruments are used to monitor process parameters, such as pressure, temperature, flow and level, of process fluids used in industrial processes. For example, process transmitters are typically employed in industrial manufacturing facilities at multiple locations to monitor a variety of process parameters along various production lines. Process transmitters include sensors that produce an electrical output in response to physical changes in the process parameter. For example, pressure transmitters include pressure transducers that produce an electrical output as a function of the pressure of a process fluid, such as in water lines, chemical tanks or the like. Each process transmitter also includes transmitter electronics and circuitry for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics and circuitry that transmit the electrical output over a control loop or network to a central monitoring location such as a control room. Configured as such, the process parameter can be regulated from the control room by including automated switches, valves, pumps and other similar components in the process control system and the control loop.

It is frequently desirable to perform checks or diagnostics of the process control loop to verify operation and performance of each transmitter within the control loop. More particularly, it is desirable to verify performance of each transmitter remotely from the control room without performing invasive procedures on the control loop or physically removing the transmitter from the control loop and industrial process control system. Currently, diagnostic capabilities are limited to obtaining information relating only to performance of the control loop and transmitter electronics. For example, the control room is able to initiate a test signal that originates from the transmitter electronics and then propagates throughout the control loop. The control room, knowing the magnitude and quality of the initiated test signal, can then verify that the control loop and transmitter respond properly to the test signal. The control room thus mimics sensor output and checks that the electronics and control loop respond in kind. The control loop, however, is not able to verify functionality of the sensor. For example, the mimicked test signal does not verify if the sensor is undamaged and producing a valid pressure signal.

Sensors respond to a physical change in the process fluid, rather than an electrical input. For example, capacitance-based pressure sensors used in pressure transmitters include a fixed electrode plate and an adjustable electrode plate, which typically comprises a flexible sensor diaphragm. The sensor diaphragm is connected to the process fluid through a simple hydraulic system that communicates the process fluid pressure to the sensor. The hydraulic system comprises a sealed passageway positioned between the sensor diaphragm at a first end, and a flexible isolation diaphragm at a second end to engage the process fluid. The sealed passageway is filled with a precise amount of hydraulic fluid that adjusts the position of the sensor diaphragm as the process fluid influences the isolation diaphragm. As the pressure of the process fluid changes, the position of the sensor diaphragm changes, resulting in a change in capacitance of the pressure sensor. The electrical output of the pressure sensor is related to the capacitance and thus changes proportionally as the process fluid pressure changes. Thus, proper verification of the sensor requires physically moving the sensor diaphragm.

Previous attempts at sensor diagnostics have involved using deadweight testers or hand pumps to deliberately increase the pressure of the process fluid or the fill fluid to check if the sensor responds. These methods require that an operator visit the location of the transmitter and that the process transmitter to be taken offline, thus inhibiting automation of the verification process. Other methods involve providing piezoelectric crystals within the fill fluid that create a transient pressure pulse that influences the sensing diaphragm. Other attempts have involved using accelerometers to detect induced vibrations of the fill fluid to compare with corresponding changes in sensor output. It is, however, difficult to control the pulses generated by the crystals or the induced vibrations. Thus, repeatability of the diagnostic is limited and verification of the pressure sensor is inconsistent. It is also difficult to provide activation energy to piezoelectric crystals within the fill fluid or supply adequate power to the accelerometers, as the fill fluid is sealed within the hydraulic system. Furthermore, such systems add considerable expense to the transmitter and manufacturing thereof. There is, therefore, a need for a simple and cost effective diagnostic system and method that accurately verifies operation of sensors in industrial process transmitters.

SUMMARY

The present invention is directed to a process transmitter for measuring a process variable in an industrial process. The process transmitter comprises a gauge pressure sensor, an excitation source and transmitter circuitry. The gauge pressure sensor measures a pressure difference between a process fluid and a reference volume, and generates a pressure sensor signal representing the pressure difference. The excitation source generates a pressure pulse within the reference volume to influence generation of the pressure sensor signal. The transmitter circuitry is connected to the gauge pressure sensor to provide an output related to a change in the pressure sensor signal due to the pressure pulse.

DETAILED DESCRIPTION

Figure 1:
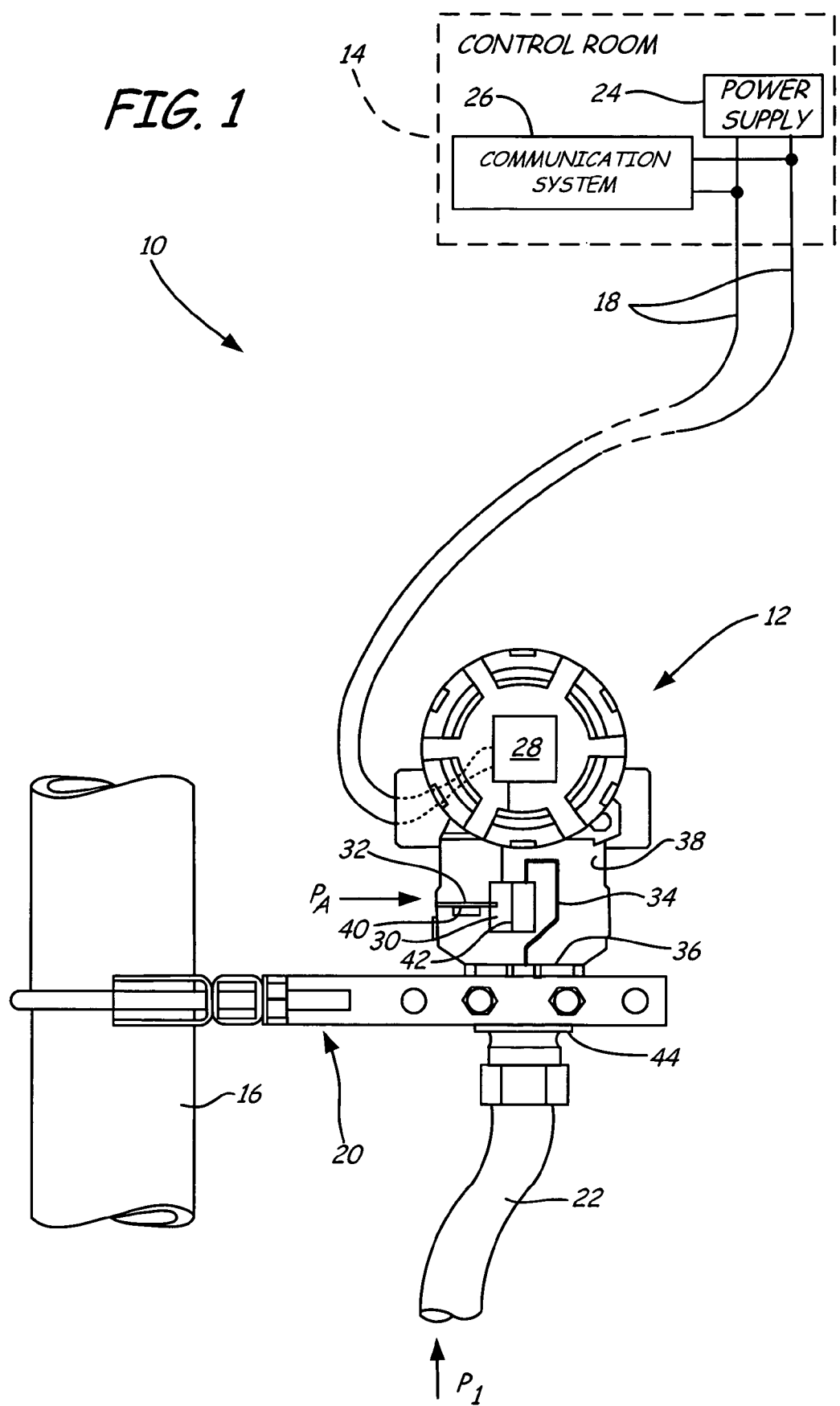
FIG. 1 shows a process control system schematic including a process transmitter having an excitation source for performing pressure-based gauge sensor diagnostics.

FIG. 1 shows process control system 10, which includes process transmitter 12, control room 14 and process pipe 16. Process transmitter 12 is connected to control room 14 through control loop 18, and to process pipe 16 through bracket 20. Pressure of a process fluid, such as a fluid within pipe 16, is fluidly connected to transmitter 12 through process connection 22. Control room 14 supplies power to transmitter 12 from power supply 24 over control loop 18. Control loop 18 also enables communication system 26 to transmit data from control room 14 to transmitter 12, and to receive data from transmitter 12. In various embodiments, control loop 18 and communication system 26 operate over a digital network protocol such as FOUNDATION™ Fieldbus, or an analog network protocol such as a 4-20 mA HART® system. In other embodiments, transmitter 12 and control room 14 communicate over a wireless network, such as WirelessHART®. In still other embodiments, output of transmitter 12 is readable by a handheld interrogator device linked, by wires or wirelessly with pressure transmitter 12. Process transmitter 12 includes a gauge pressure sensor that senses the pressure difference between pressure $P_1$ of a process fluid and pressure $P_A$ of the atmosphere, and then relays an electronic signal to control room 14 over control loop 18.

Pressure transmitter 12 includes transmitter circuitry 28, sensor 30, reference tube 32, isolation tube 34, isolation diaphragm 36, housing 38 and pressure producing means 40. Transmitter circuitry 28 is electronically connected to control loop 18 and sensor 30 using any suitable means that are known in the art. Transmitter circuitry 28 includes components and electronics for transmitting electrical pressure signals generated by pressure sensor 30 over control loop 18 to control room 14 or a local display, such as an LCD screen disposed within housing 38, or both. Circuitry 28 also conditions the output of sensor 30 into a format compatible with control loop 18. Based on the data received from sensor 30 and transmitter 12, control room 14 is able to adjust process parameters either through control loop 18 or another control loop. For example, control room 14 can adjust the flow of process fluid within pipe 16 by adjusting appropriate actively controlled valves. Furthermore, through control loop 18 control room 14 is able to perform diagnostic evaluation of transmitter 12 using communication system 26 and transmitter circuitry 28. Specifically, using pressure producing means 40, control room 14 is able to verify mechanical and electrical functionality of sensor 30.

Sensor 30 comprises a pressure sensor having a flexible sensor element 42 that moves in response to pressures $P_1$, such as from a process fluid presented through connection 22, and atmospheric pressure $P_A$. In one embodiment, connection 22 comprises an impulse pipe for connecting to a process pipe, such as pipe 16, through, for example a process manifold. In another embodiment connection 22 comprises a remote seal assembly capillary tube. Isolation tube 34 comprises a passageway that is fluidly coupled to sensor 30 at a first end and isolation diaphragm 36 at a second end. Isolation diaphragm 36 is connected to housing 38 near coupling 44. The exterior of coupling 44 attaches to bracket 20 such that transmitter 12 is supported by pipe 16. The interior of coupling 44 attaches to connection 22 to fluidly connect a process fluid to isolation diaphragm 36. Hydraulic isolation tube 34 is supplied with a sensor fill fluid. The fill fluid is substantially incompressible to transmit pressures $P_1$ from isolation diaphragm 36 to sensor 30. The fill fluid typically comprise a silicone-oil hydraulic fluid, such as DC 200®, DC 704® or Syltherm XLT® silicone-oil as is commercially available from Dow Corning Corporation, Midland, Mich. However, other fluids are also used. The fill fluid displaces the position of flexible sensor element 42 within sensor 30, which changes the electronic pressure signal generated by sensor 30, thus indicating a change in pressures $P_1$. Reference tube 32 connects the exterior of housing 38 to flexible sensor element 42 within sensor 30. Reference tube 32 conveys atmospheric pressure $P_A$ from outside of transmitter 12 to flexible sensor element 42, while inhibiting environmental contaminants from entering transmitter 12. Likewise, atmospheric pressure $P_A$ acts on the source of pressure connected to isolation tube 34 such that changes in ambient pressure act equally on both sides of sensor element 42. Sensor 30 senses a differential pressure between the process fluid and atmospheric pressure, resulting in a gage pressure reading. Thus, a process fluid is hydraulically linked with sensor 30 wherein $P_1$ is commonly referred to the high pressure side and $P_A$ is commonly referred to as the low pressure side.

Figure 9:
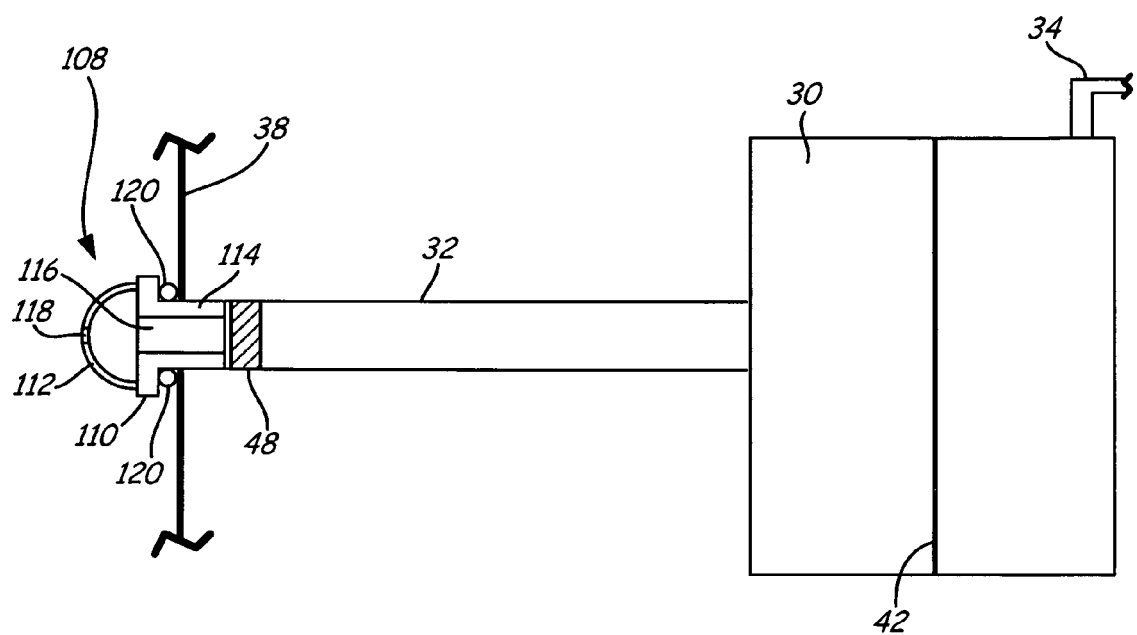
FIG. 9 shows a schematic of the process transmitter of FIG. 1 in which the excitation source comprises a pressure bulb.
Figure 10:
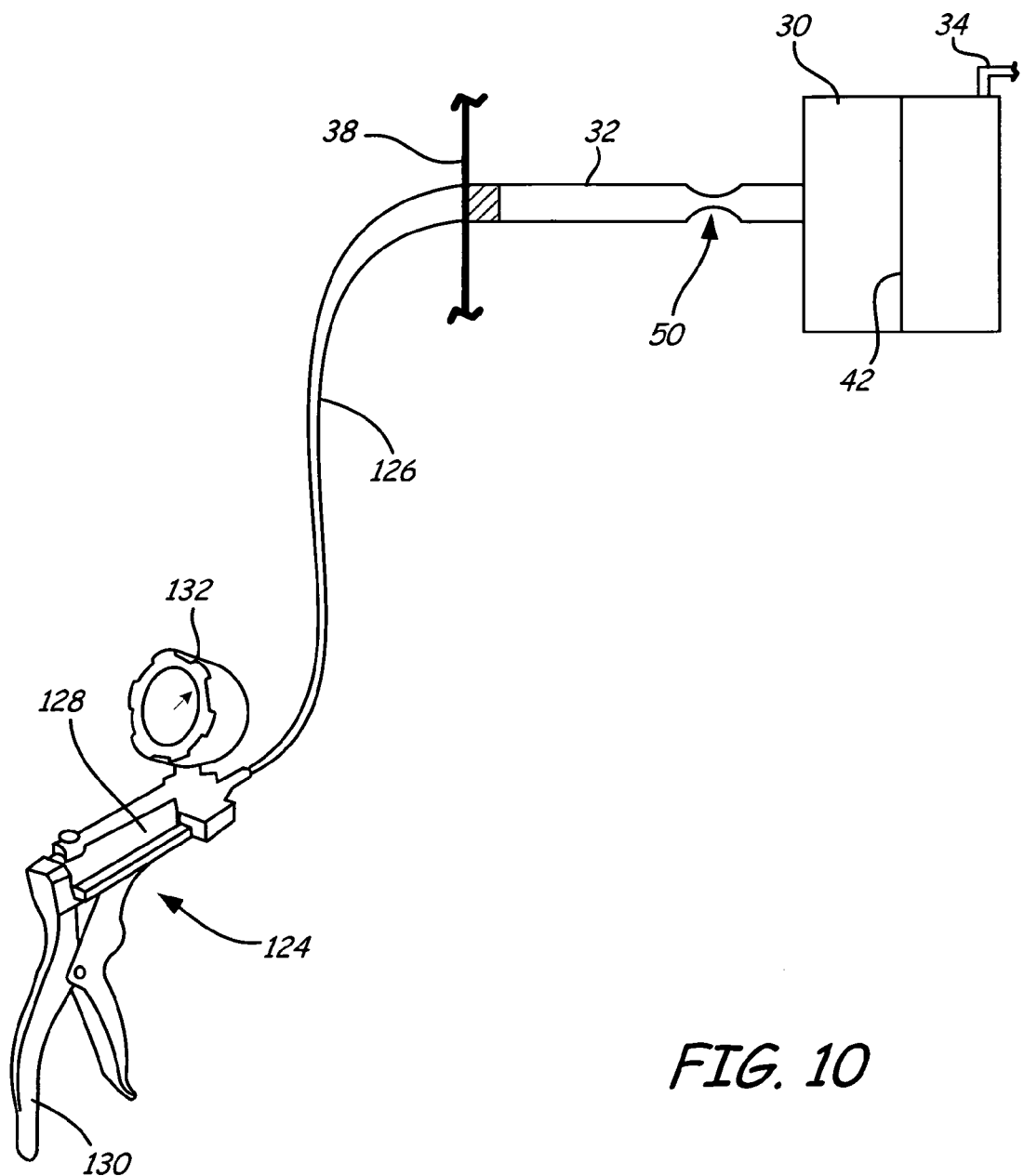
FIG. 10 shows a schematic of the process transmitter of FIG. 1 in which the excitation source comprises a calibrated pressure pump.

Pressure producing means 40 comprises an excitation source for generating a pressure pulse within reference tube 32. Pressure producing means 40 is operated, either through transmitter circuitry 28 or direct operator manipulation. The magnitude of the pressure pulse is known to a sufficient level to cause a controlled pressure change in the air inside reference tube 32. The pressure pulse causes a temporary, transient change, either positive or negative, to the pressure of the air and a deflection of flexible sensor element 42 within sensor 30. Transmitter circuitry 28 and control room 14 are able to verify that sensor 30 produces a change in the sensor signal, and that the change corresponds to the input of pressure producing means 40. In other embodiments, operation of sensor 30 can be directly verified by operator observation. Pressure producing means 40 may comprise a variety of mechanisms and systems for causing a controlled pressure pulse within reference tube 32. In one embodiment, pressure producing means 40 comprises a heating device, as shown in FIGS. 2-8. Pressure producing means 40 may also comprise sources of direct pressure as shown in FIGS. 9 and 10.

Figure 2:
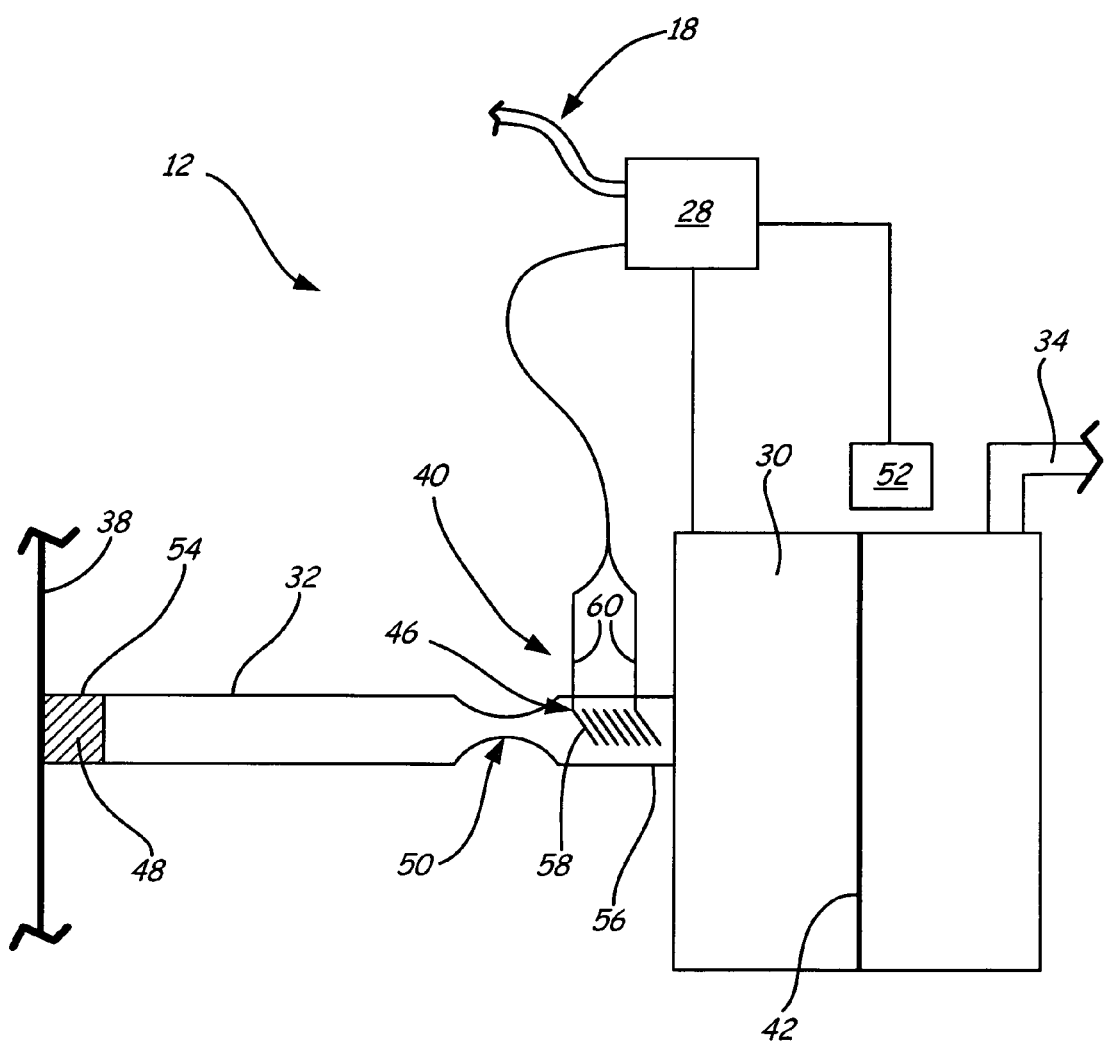
FIG. 2 shows a schematic of the process transmitter of FIG. 1 in which the excitation source comprises a heating device.
Figure 3:
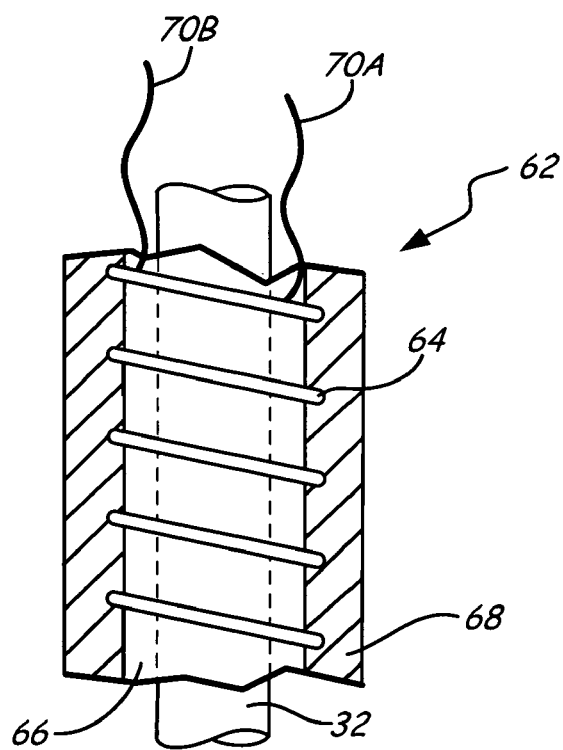
FIG. 3 shows an embodiment of a heating device for use in the process transmitter of FIG. 2 wherein the heating device comprises a resistance wire coil.

FIG. 2 shows one embodiment of the present invention in which pressure producing means 40 of process transmitter 12 comprises heating device 46. Process transmitter 12 also includes transmitter circuitry 28, pressure sensor 30, reference tube 32, isolation tube 34, housing 38, flexible sensor element 42, plug 48 and constriction 50. Heating device 46 comprises a resistive heating element disposed adjacent reference tube 32. Although heating device 46 is shown disposed within reference tube 32 in FIG. 2, heating device 46 may be connected to the exterior or interior of reference tube 32, as shown in FIG. 3.

Isolation tube 34 typically comprises a segment of stainless steel tubing welded to housing 38 near isolation diaphragm 36 (FIG. 1) at a first end and sensor 30 at a second end. Likewise, reference tube 32 typically comprises a segment of stainless steel tubing connected to housing 38 at a first end and welded to sensor 30 at a second end. Isolation tube 34 and reference tube 32 may also be formed of plastic materials in other embodiments. Isolation tube 34 and reference tube 32 are connected to sensor 30 on opposite sides of sensor element 42 such that each tube presents a different pressure to sensor 30. Sensor 30 thus senses the difference in pressure between pressure $P_1$ and atmospheric pressure $P_A$. Sensor 30 includes wiring (not shown) for connecting to transmitter circuitry 28 such that a sensor signal produced by sensor 30 that is representative of the magnitude of the pressure differential between $P_A$ and $P_1$ can be transmitted over control loop 18.

Pressure transmitter 12 includes other electronics, such as temperature sensor 52, for conditioning the sensor signal and performing other functions. Temperature sensor 52, which may comprise a thermistor or Platinum Resistance Thermometer (PRT) as is typically included in pressure transmitters, is positioned to determine the ambient temperature around sensor 30 within housing 38. Temperature sensor 52 may be deposited on a flex circuit connected to transmitter circuitry 28 such that temperature sensor 52 can be positioned in close proximity to pressure sensor 30. Thus, variations in the pressure signal generated by sensor 30 due to changed temperature conditions within housing 38 can be compensated for temperature error by circuitry 28 such that the pressure of the process fluid is relayed accurately to control room 14. Heating device 46 includes lead wires connecting to transmitter circuitry 28 such that heating device 46 is in communication with control room 14 through control loop 18. Heating device 40 is positioned on reference tube 32.

Sensor 30 is a transducer that produces an electrical signal in response to a change in pressure $P_1$. A change in pressure $P_A$ affects both sides of sensor element equally such that no change in pressure is sensed. In the embodiment shown, sensor 30 comprises a differential, capacitance-based pressure cell in which sensor element 42 comprises a flexible capacitor plate. Such capacitive pressure sensors are well known in the art and are described in U.S. Pat. No. 6,295,875 to Frick, which is assigned to Rosemount Inc., Eden Prairie, Minn. and is incorporated by this reference. In other embodiments, sensor 30 comprises a strain gauge in which sensor element 42 comprises a silicon chip diaphragm. Such strain gauge pressure sensors are well known in the art and are described in U.S. Pat. No. 4,970,898 to Walish et al., which is assigned to Rosemount Inc., Eden Prairie, Minn. and is incorporated by this reference.

Sensor element 42 comprises a gauge pressure sensor that reacts to pressures $P_1$ and $P_A$ as presented to sensor 30 through the fill fluid in isolation tube 34 and atmospheric gas in reference tube 32. The pressure presented by the fill fluid, $P_1$, varies as the pressure of the industrial process being monitored changes. Pressure $P_1$ is thus the pressure of interest for which it is desirable to know the magnitude. It is often desirable to know the magnitude of pressure $P_1$ with reference to ambient pressure, atmospheric pressure $P_A$. Reference tube 32 presents pressure $P_A$ to sensor element 42 through atmospheric gas, e.g. air. Without venting to atmospheric pressure provided by reference tube 32, pressure $P_1$ would change as atmospheric conditions changed. Thus, as atmospheric conditions change, pressure $P_A$ and the pressure it exerts on $P_1$ change such that the magnitude of the pressure signal generated by sensor 30 does not change.

The present invention provides a system and method for diagnosing and verifying the performance and operation of the entire measurement system including control loop 18, process transmitter 12, and connection 22. Within process transmitter 12, the present invention provides a system and method for diagnosing and verifying the performance and operation of electronics 28, sensor 30, isolation tube 34, isolation diaphragm 36 and reference tube 32. More particularly, pressure producing means 40 produces a controlled pressure pulse within reference tube 32. The pressure pulse causes a momentary or dynamic change in pressure within reference tube 32. Pressure producing means 40 is positioned within housing 38 to cause a local increase or decrease in pressure of atmospheric air within reference tube 32. Air or gas expands favorably when heated, particularly as compared to thermal expansion rates of fill fluids typically found in pressure sensors. This pressure change causes a physical change in the position of flexible sensor element 42 such that a true pressure signal is generated by circuitry 28 that can be used to verify operation of the entire measurement system. Although FIG. 2 depicts an embodiment of the invention in which pressure producing means 40 is positioned within housing 38 and within tube 32, in other embodiments of the invention, pressure producing means 40 is connected to the outside of tube 32, both inside and outside of housing 38.

Localized pressurization of the atmospheric air within reference tube 32 provides a sufficient pressure differential between reference tube 32 and isolation tube 34 to cause a displacement of flexible sensor element 42. Isolation diaphragm 36 (FIG. 1) and flexible sensor element 42 bound isolation tube 34 such that the volume of fill fluid within isolation tube 34 is constant. The combination of plug 48 and constriction 50 provide a dynamic barrier to first end 54 of reference tube 32, while flexible sensor element 42 bounds second end 56 of reference tube 32. As such, the volumes of air and fill fluid within reference tube 32 and isolation tube 34, respectively, can be considered constant, at least for a limited time frame. As such, the Ideal Gas Law simplifies to an isochoric process in which the ratio of pressure $(P_R)$ over temperature $(T_R)$ within reference tube 32 is constant, as shown in Equation (1).

$$\frac{P_i}{T_i} \propto \frac{P_f}{T_f} \qquad \text{Equation (1)}$$

Thus, within reference tube 32, the final pressure $P_f$ will be equal to the initial pressure $P_i$ times the ratio of the final temperature $T_f$ divided by the initial temperature $T_i$, as shown in Equation (2).

$$P_f = P_i \left(\frac{T_f}{T_i}\right) \qquad \text{Equation (2)}$$

For example, if the temperature within reference tube 32 was raised about 50° C. above ambient temperature of about 22° C., the pressure within reference tube 32 would increase from ambient pressure of about 14.7 pounds per square inch [psi] (~101 kPa) to about 17.2 psi (~119 kPa), as shown in Equation (3), noting that all values are referenced to absolute pressure and temperature.

$$P_f = P_i[14.7 \; psi]\left(\frac{T_f[345 \; K]}{T_i[295 \; K]}\right) = 17.2 \; psi \qquad \text{Equation (3)}$$

Thus, the specific increase in pressure, and corresponding pressure signal, will vary depending on ambient temperatures. Variations in induced temperature signals can be accounted for with conventional temperature compensation routines. The ideal gas law is a powerful method to create a large, controllable pressure signal to test the entire measurement system. The specific increase in temperature, and corresponding pressure signal, will vary depending upon the initial pressure, the initial temperature, and the final temperature. Variations in induced temperature signals can be accounted for with conventional temperature compensation routines.

In various embodiments of the invention, pressure producing means 40 directly increases pressure $P_R$ within reference tube 32, or indirectly increases pressure $P_R$ by increasing the temperature $T_R$. A change in temperature $(T_f-T_i)$ can be provided by adding a controlled amount of heat to the air within reference tube 32 using local heating devices, as is described with reference to FIGS. 2-8. A change in pressure $(P_f-P_i)$ can be provided by adding a mass of air to reference tube 32 using various input devices, as described with reference to FIGS. 9 & 10. The increased pressure within reference tube 32 causes a deflection of flexible sensor element 42. Very small pressures are detectable by sensor 30 and thus only a small change in the pressure within reference tube 32 is needed. The resulting pressure change caused by pressure producing means 40 is used to perform diagnostics of sensor 30, transmitter 12 and system 10, as is described with reference to FIGS. 11-13D.

The present invention is applicable to all ranges of gauge pressure sensors. For example, previous thermal-based diagnostic systems for differential pressure sensors relied on heating of fill fluid within an isolation tube. Heating of fill fluid between an isolation diaphragm and a sensor diaphragm, however, required thermal expansion of the fill fluid to such a degree that deflection of the isolation diaphragm is overcome. For example, on a typical low range capacitive pressure sensor having an upper pressure range of 3 inches of water (~750 Pa), a sensor diaphragm is two and a half times stiffer than an isolation diaphragm. For a typical high range capacitive pressure sensor having an upper pressure range of 2000 pounds per square inch (psi) (~14 MPa), a sensor diaphragm is eleven thousand times stiffer than an isolation diaphragm. As such, isolation diaphragms are more likely to deflect and absorb the majority of the thermal expansion of the fill fluid. In the present invention, the need to overcome a deflection of an isolation diaphragm is eliminated in gauge pressure sensors. Thus, small deflections of flexible sensor element 42 can be accomplished by providing a thermal expansion of the air within reference tube 32.

In the embodiment of FIG. 2, the diagnostic system of the present invention effects a controlled movement of flexible sensor element 42 using heating device 46 such that verification of mechanical operation of sensor 30 can be performed by transmitter circuitry 28 and control room 14 (FIG. 1). As described above, very small pressure changes can be detectable by sensor 30. Thus, only a small change in the pressure of the air in reference tube 32 is required from the thermal expansion. Temperature sensor 52 monitors the heat output of heating device 46 such that the thermal input into the air can be monitored to accurately assess the change in the pressure signal. For example, temperature sensor 52 can be mounted directly to reference tube 32 to monitor the temperature generated along reference tube 32. Thus, transmitter circuitry 28 can use the output of sensor 30 to verify operation of heating device 46 and calibrate the magnitude of the pressure signal change to the magnitude of the heat input into the gas inside reference tube 32. In various embodiments, the local temperature in reference tube 32 can rise to over 212° F. (~100° C.) from thermal output of heating device 46.

Heat from heating device 46 causes an increase in the temperature of atmospheric air within reference tube 32. The heat causes thermal expansion of the air. However, reference tube 32 is substantially blocked off by constriction 50 such that, rather than causing a volumetric expansion of the air, the air undergoes an increase of pressure. Constriction 50 does not completely seal reference tube 32 such that the air undergoes a slight increase in volume and escapes out of reference tube 32. Constriction 50 does not prevent flow of air into and out of reference tube 32, but rather forms a reduction in the cross-sectional area of reference tube 32 to slow the flow of air. Heating device 46 is positioned between constriction 50 and sensor 30, and constriction 50 is positioned close to sensor 30 to reduce the volume of air that heating device 46 heats, thus also reducing power requirements. Dimensions of constriction 50 are designed to both temporarily maintain a transient pressure created by thermal expansion and to allow air inside the reference tube to react to atmospheric pressure changes. Constriction 50 also serves as a flame quenching safety feature that prevents any flame or spark originating inside of housing 38 from reaching the ambient atmosphere surrounding transmitter 12. In such an embodiment, constriction 50 may comprise an elongated flattened constriction extending across much of the length of reference tube 32.

Plug 48 comprises a porous plug that prevents dust, dirt and other debris from entering reference tube 32. In one embodiment, plug 48 is formed of Teflon®. As such, plug 48 does not prevent flow of atmospheric air into and out of reference tube 32, but rather forms a porous obstacle to prevent particulates from entering the tube. Plug 48 could be designed to function as both a plug and as a flow constrictor by choosing a material with the appropriate porosity.

Constriction 50 inhibits expansion of air at first end 54 of reference tube 32. As such, expansion of air within reference tube 32 is promoted at second end 56 near flexible sensor element 42 to induce a change in the pressure signal. Because, however, constriction 50 is not impermeable, atmospheric air will expand to escape reference tube 32 at first end 54. The rate at which heat is added to reference tube 32 by heating element 46 exceeds the rate at which the atmospheric air can expand and escape at first end 54. Constriction 50 allows for a momentary increase in the pressure within reference tube 32. The increase in pressure is dynamic in that the pressure increase will have a constant tendency to decay from escape of air and decrease in temperature. Constriction 50 could be replaced by a small electrically actuated valve. The valve can be fully opened during normal operation and fully closed when diagnostics are being performed. The valve can be actively controlled by transmitter electronics 28.

Reference tube 32 provides an easy and convenient point for accessing flexible sensor diaphragm 42. Reference tube 32 is open to atmospheric pressure and does not include a fill fluid that requires a pressure seal. Thus, it is relatively easy to bring heating devices into the interior of reference tube 32 with low pressure feedthrus. By placing heating device 46 inside reference tube 32, heat is directly imparted into the atmospheric air within tube 32, without having to transfer heat across reference tube 32.

Heating device 46 comprises wire coil winding 58 wound within reference tube 32 and having leads 60 extending from tube 32. In one embodiment of the invention, reference tube 32 comprises a 0.065 inch (~0.165 cm) diameter steel tube. Winding 58 and leads 60 may comprise any suitable material. Wire coil winding 58 may comprise any suitable resistance wire, and leads 60 may comprise any suitable conductive wire as is commercially available. In one embodiment, winding 58 is comprised of a nickel-chromium alloy wire that is commonly used to produce resistance elements, and leads 60 are comprised of a highly thermally conductive copper.

Coil 58 includes positive and negative leads 60 that extend through bores within reference tube 32. The bores may be sealed by any suitable means to prevent moisture and other contaminants from entering housing 38. The seals, however, do not need to be rated to high process pressures. In other embodiments, leads 60 may enter reference tube 32 at first end 54 by passing through bores within plug 48. Leads 60 receive current from transmitter circuitry 28 or another source. The resistance of the wire produces heat as the current is passed through coil 58. Coil 58 is electrically energized to provide resistance heat to the interior of reference tube 32, thereby directly heating the atmospheric air. In other embodiments, however, the heating device may be placed outside of reference tube 32, such as when intrinsic safety is an issue.

FIG. 3 shows another embodiment of a heating device suitable for use with the present invention. Heating device 62 comprises resistance wire coil winding 64, isolation sleeve 66 and insulation sleeve 68, which are concentrically wrapped around reference tube 32. Insulation sleeve 68 is shown cutaway in FIG. 3 to show isolation sleeve 66 and coil winding 64. Wire coil winding 64 and leads 70A and 70B may comprise any suitable resistance wire as is commercially available. The ends of coil winding 64 are connected to lead wires 70A and 70B, which are connected to transmitter circuitry 28. Lead wires 70A and 70B draw current from circuitry 28. In other embodiments, wires 70A and 70B draw current from other sources. The resistance of the wire comprising winding 64 produces heat as the current is passed through device 62. Heat is conducted to the atmospheric air within reference tube 32 through isolation sleeve 66 causing the air to heat up and increase the pressure within tube 32 such that diagnostics of the present invention can be performed.

Transmitters are used in a wide variety of industries, where they are potentially exposed to environments where dangers from explosion exist, such as gas refineries. Coil winding 64 poses a potential ignition point when current is conducted through it, as the potential for high temperatures exists. Thus, insulation sleeve 68 is provided to reduce surface temperature from winding 64 to maintain the intrinsic safety of transmitter 12. In one embodiment, insulation sleeve 68 prevents the surface of reference tube 32 from reaching approximately 200° C. (~392° F.) such that a T4 rating is achieved. Insulation sleeve 68 also increases the efficiency of heating device 62 by concentrating heat around reference tube 32, which is grounded external to transmitter 12. Insulation sleeve 68 covers the outside of winding 64 to provide a thermal barrier to the air surrounding reference tube 32. In one embodiment, insulation sleeve 68 comprises any material suitable for providing electrical and thermal insulation, such as a rubber or plastic sleeve or coating. Isolation sleeve 66 comprises a thin layer of a material to electrically isolate reference tube 32 from winding 64. In one embodiment, isolation sleeve 66 comprises a 0.020 inch (~0.051 cm) thick layer of ceramic material, although any suitable material having high thermal conductivity may be used.

Heating device 62 and other external heating devices for reference tube 32 are also suitable for use with devices using closed reference volumes. Gauge pressure transmitters intended for sensing very large pressures, such as a 5,000 psi (~34.4 MPa) Rosemount 4600 pressure transmitter commercially available from Rosemount Inc., Eden Prairie, Minn., use closed reference volumes. This is permissible because changes in atmospheric pressure are negligible compared to the magnitude of the sensed pressure. Heating of the outside of the closed reference volume provides an effective means for expanding the volume of air within the reference volume to perform diagnostics on the pressure sensor. As the ideal gas law illustrates (See Equation (1)), heating of a closed volume produces a proportional increase in pressure that can be sensed by the pressure sensor. In other embodiments of the invention, plug 48 can comprise a solid plug that closes the volume within reference tube 32 such that applied heating produces a more steady increase in pressure.

Figure 4:
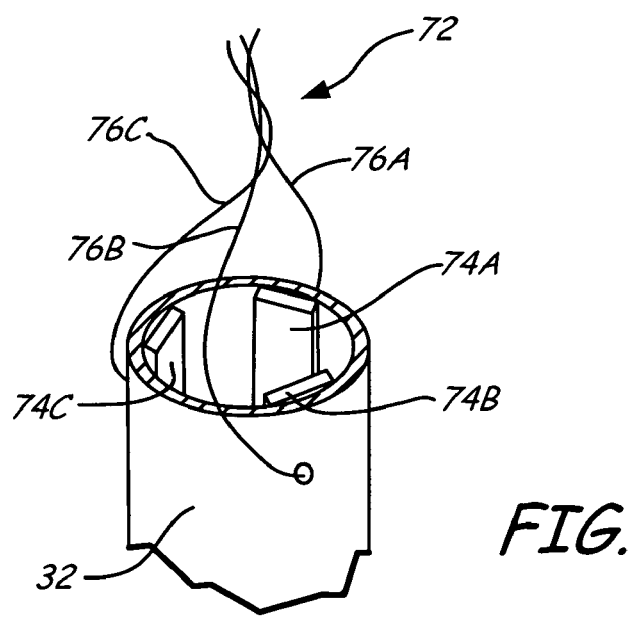
FIG. 4 shows another embodiment of a heating device for use in the process transmitter of FIG. 2 wherein the heating device comprises a plurality of resistors.

FIG. 4 shows yet another embodiment of a heating device suitable for use with the present invention. Heating device 72 is comprised of a plurality of resistors 74A, 74B and 74C that are disposed about the inner surface of reference tube 32. Resistors 74A, 74B and 74C draw current from circuitry 28 or another source such that heat is generated and dissipated as the current passes through. The heat thermally heats the air within reference tube 32 such that diagnostics of the present invention can be performed. In the embodiment shown, heating device 72 comprises three resistors, but any number can be used depending on their size and resistance. Resistors 74A, 74B and 74C are distributed equally about the perimeter of reference tube 32 to provide maximum exposure of the resistors to the gas volume of reference tube 32. Resistors 74A-74C can be affixed to reference tube 32 by any means suitable for efficiently transferring heat from the resistors to the isolation tube. For example, highly conductive glue may be used in one embodiment. In other embodiments; other means such as soldering or banding may be used. Resistors 74A, 74B and 74C are connected in parallel and include lead wires 76A, 76B and 76C, which include input lines and output lines and are connected to circuitry 28. Lead wires 76A-76C pass through bores in reference tube 32, although in other embodiments may pass into reference tube 32 through plug 48 near first end 54 (FIG. 2). Resistors 74A-74C may comprise any suitable resistive material as is commercially available and may be of any suitable resistance to provide the desired heat output and that is compatible with circuitry 28. However, in other embodiments, fabricated resistance heaters may be used. Resistive heating devices may also be placed outside of reference tube 32 such that they can be jacketed to provide intrinsic safety measures.

Figure 5:
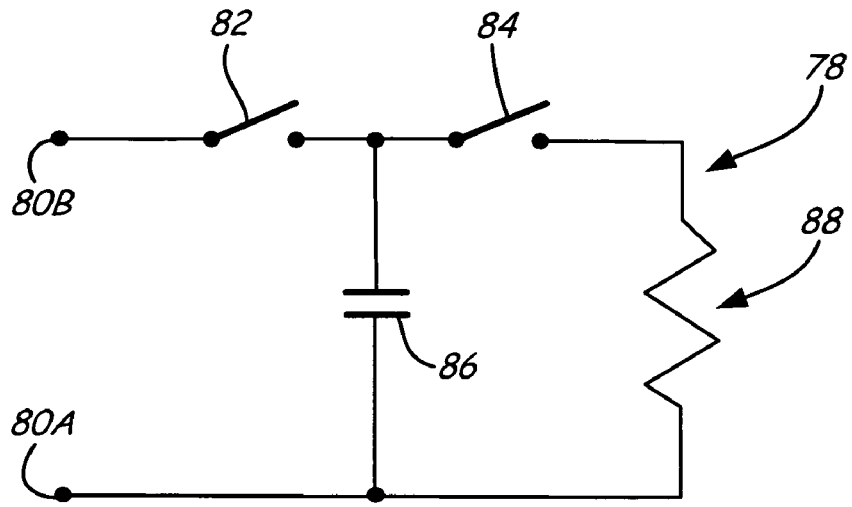
FIG. 5 shows a control circuit including a heating device and a capacitor that is connected to transmitter circuitry to power the heating device of FIG. 2.

FIG. 5 shows an electrical schematic of a circuit for drawing power from a transmitter to supply the thermal-based diagnostic system of the present invention. Circuit 78 comprises terminals 80A and 80B, first switch 82, second switch 84, capacitor 86 and heating device 88. Heating device 88 comprises any resistive heating device suitable for use with the present invention, such as device 46, device 72 or some other heating element. Heating device 88 is connected through lead wires, such as wires 60 or wires 76A-76C, to first terminal 80A and second switch 84. Second switch 84 is connected to first switch 82, which is connected to second terminal 80B. Terminals 80A and 80B are connected to circuitry 28 such that a closed series circuit is formed. Capacitor 86 is connected to circuit 78 between switches 82 and 84 to form a shunt around heating device 88. As such, circuit 78 is connected with power supply 24 from control loop 18.

Circuit 78 operates in two modes. In the first mode, both switches 82 and 84 remain open and circuit 78 has no effect on normal operation of sensor 30. In the second mode, circuit 78 begins a sequence that will ultimately deliver power to heating device 88. The second mode is a two step process. In the first step, switch 82 is closed to begin charging capacitor 86 such that energy is stored on capacitor 86. For example, many transmitters operate at 12 volts over a 4 to 20 mA HART® network. In such a system, transmitter circuitry 28 requires 4 mA of current for quiescent operation, when no communication is required over control loop 18. The zero to full scale pressure signal is represented by the 4 to 20 mA signal, and is what is communicated over control loop 18. Additionally, the HART® digital protocol can also communicate over control loop 18.

In the first step, transmitter 12 temporarily stops communicating the 4 to 20 mA signal. This energy, normally used for communication to control loop 18, is now diverted to charge capacitor 86. The actual energy diverted to capacitor 86 is dependent upon circuit design efficiencies and other factors. One example is to charge capacitor 86 with 12 mA for 200 seconds. For a 1 Farad capacitor, the final voltage across capacitor 86 would be approximately 2.4 volts, resulting in approximately 5.76 Joules of energy being stored on capacitor 86, as are determined by known electrical relationships.

In the second step, switch 82 is opened. When it is desired to diagnose the operation of sensor 30, switch 84 is closed to discharge the energy stored on capacitor 86 to heating device 88. The resistance of heating device 88 is chosen to rapidly discharge capacitor 86 in several seconds. This rapid discharge causes a rapid rise in temperature of the air within reference tube 32 providing the necessary pressure pulse to perform the diagnostics of the present invention.

In other embodiments, capacitor 86 can be continuously slowly charged therefore becoming available to perform a diagnostic on demand. For example, first switch 82 may remain closed and terminals 80A and 80B may be connected to transmitter circuitry 28 through a current regulating device, as is known in the art. The benefit of this embodiment is that transmitter 12 does not have to be taken off-line to charge capacitor 86. In other embodiments, switches 82 and 84 are electronic switches digitally controlled by transmitter circuitry 28. In other embodiments, discharging current from capacitor 86 can be directed to heating device 88 using a current regulating circuit.

Energy stored in capacitor 86 by any means powers heating device 88 where it is dissipated as thermal energy, thus causing heating of atmospheric air within reference tube 32 that induces a deflection of flexible sensor element 42. Using Joule's law, the magnitude of the thermal energy Q available from heating device 88 can be calculated from the resistance R of heating device 88, the amount of current i that can be delivered to heating device 88 from capacitor 86, and the length of time t that the current is supplied to heating device 88, as indicated by Equation (4).

$$Q = i^2 R t \ [J] \quad \text{Equation (4)}$$

In some embodiments, resistors having a resistance of approximately 5 to 10Ω are used. In one other embodiment of the invention, capacitor 86 comprises a supercapacitor as is known in the art and is commercially available. Generally, supercapacitors have greater capacitance than conventional capacitors in smaller packaging due to their use of double-layer electrodes with electrochemical dielectrics. Background and construction of such supercapacitors is described in greater detail in the following references: U.S. Pat. No. 5,380,341 by Mathews et al., U.S. Pat. No. 6,512,667 by Shiue et al., U.S. Pat. No. 5,426,561 by Yen et al., U.S. Pat. No. 7,170,260 by Thrap, and U.S. Pat. No. 4,414,607 by Sekido et al. Thus, the term "supercapacitor" refers to any known high capacity, compact, capacitor, including "ultracapacitors."

Figure 6:
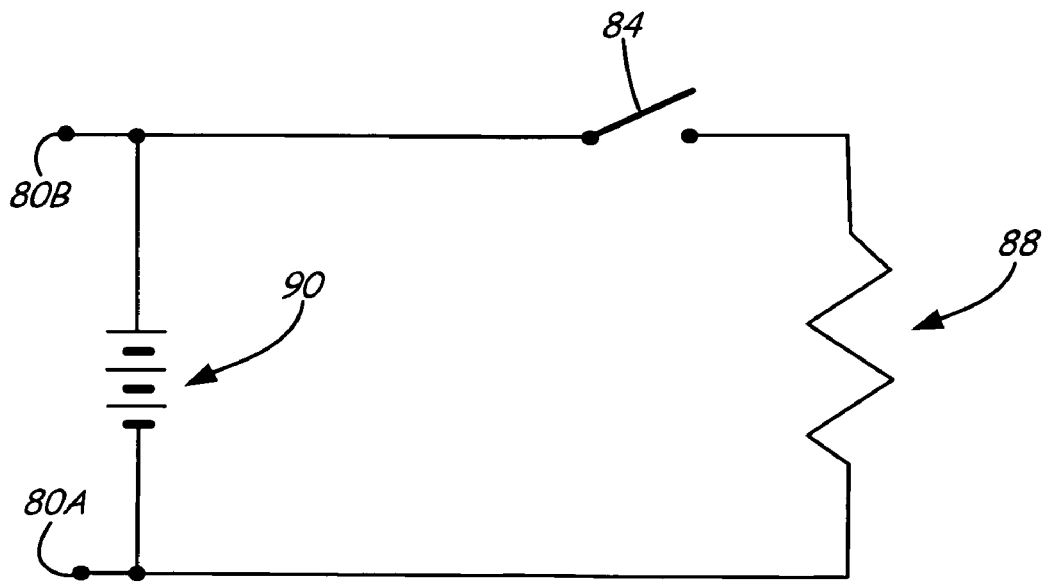
FIG. 6 shows a control circuit including a heating device and a battery that is connected to transmitter circuitry to power the heating device of FIG. 2.

FIG. 6 shows another embodiment of the invention in which power is supplied to heating device 88 from dedicated battery 90 located in housing 38 that is controlled by transmitter circuitry 28. For example, typical low voltage batteries used in industrial process transmitters for wireless networks may be used. Such batteries have small packaging such that they fit inside housing 38 and provide power such that approximately 1500 diagnostic tests could be performed, depending on the resistance of the heating element used. With respect to FIG. 5, capacitor 86 is replaced with battery 90, therefore also eliminating the need to charge the battery. Thus, the invention provides a variety of embodiments in which circuitry 28 controls current to heating elements to provide a pulsed heat input to sensor 30. In other embodiments of the invention, circuitry 28 can be directly connected to an external power supply, such as would be available in a typical commercial or industrial facility, to power heating device 88 in lieu of battery 90. Yet other sources of external power may be used to power excitation devices of the present invention, such as handheld interrogator devices.

Figure 7:
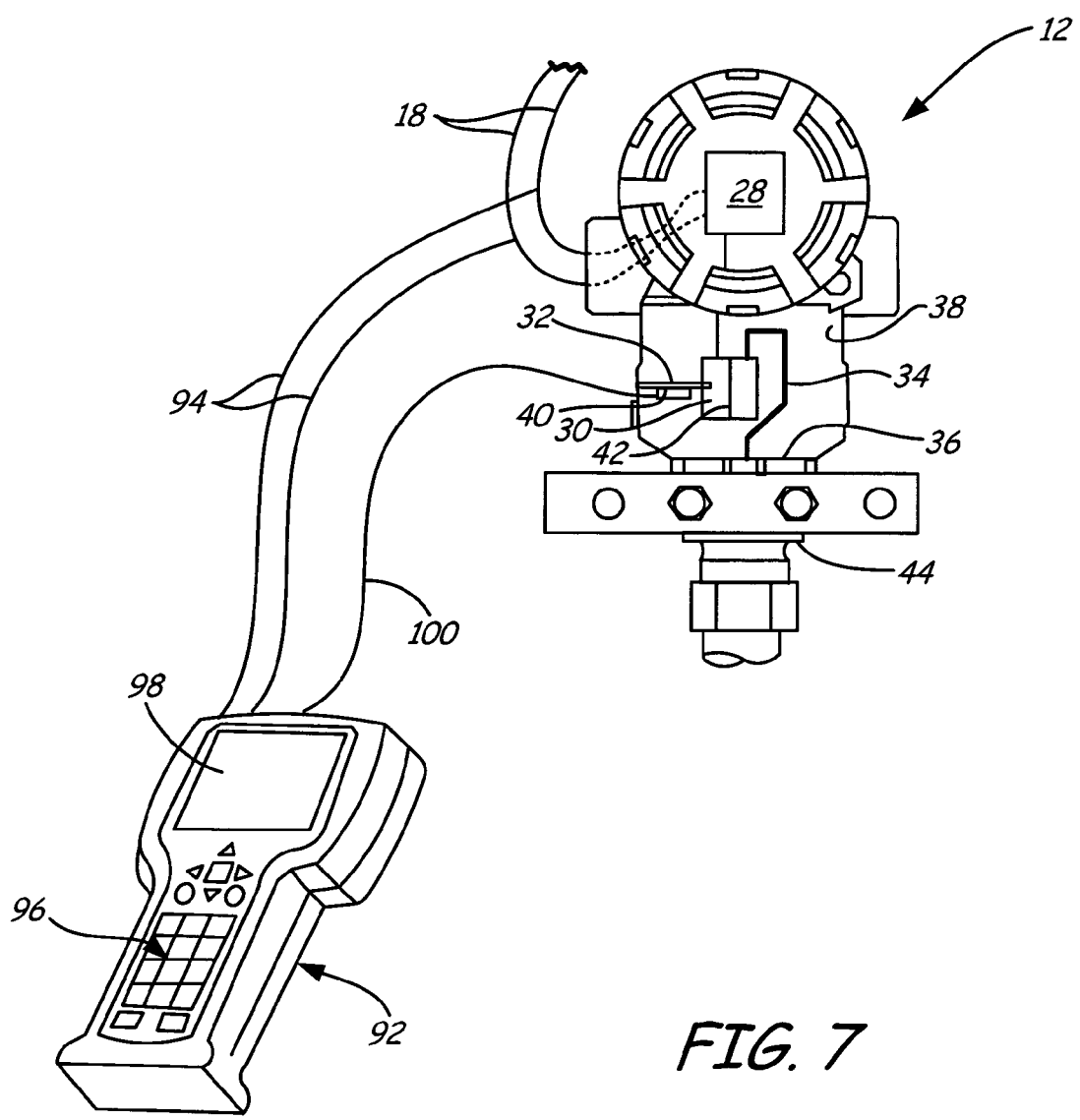
FIG. 7 shows a handheld interrogator configured to deliver power to the process transmitter of FIG. 1.

FIG. 7 shows handheld interrogator 92 configured to deliver power to coil 58 of process transmitter 12. Interrogator 90 comprises a portable device that allows operators to interface with transmitter 12 at the site of the transmitter. Interrogator 92 communicates with transmitter 12 through a wired connection using various protocols. Interrogator 92 includes wiring 94 that can be connected either to control loop 18 or directly to transmitter circuitry 28. In one embodiment, interrogator 92 comprises a 375 HART interface, as is commercially available from Rosemount Inc., Eden Prairie, Minn. Interrogator 20 includes user interfaces, such as buttons 96 and LCD 98, that enable an operator to view data received from transmitter 12 and to configure transmitter 12. In the present invention, interrogator 92 includes means for providing power to pressure producing means 40. Interrogator 92 includes power cable 100 that connects directly to pressure producing means 40. In other embodiments, power cable 100 connects to an outlet or plug on transmitter housing 38, or a terminal block within housing 38. Cable 100 allows electric power from interrogator 92 to be delivered to pressure producing means 40. Thus, in the case of heating device 46, interrogator 92 delivers current for heating reference tube 32. Interrogator 92 is capable of delivering larger power pulses to transmitter 12 than what is available from control loop 18. Interrogator 92 can also be used to deliver power to heating elements used to heat fill fluid within isolation tube 34, similar to the heating elements described in the co-pending application to Hedtke et al. having Ser. No. 12/287,106. In other embodiments, interrogator 92 can be configured to deliver heat directly to transmitter 12.

Figure 8:
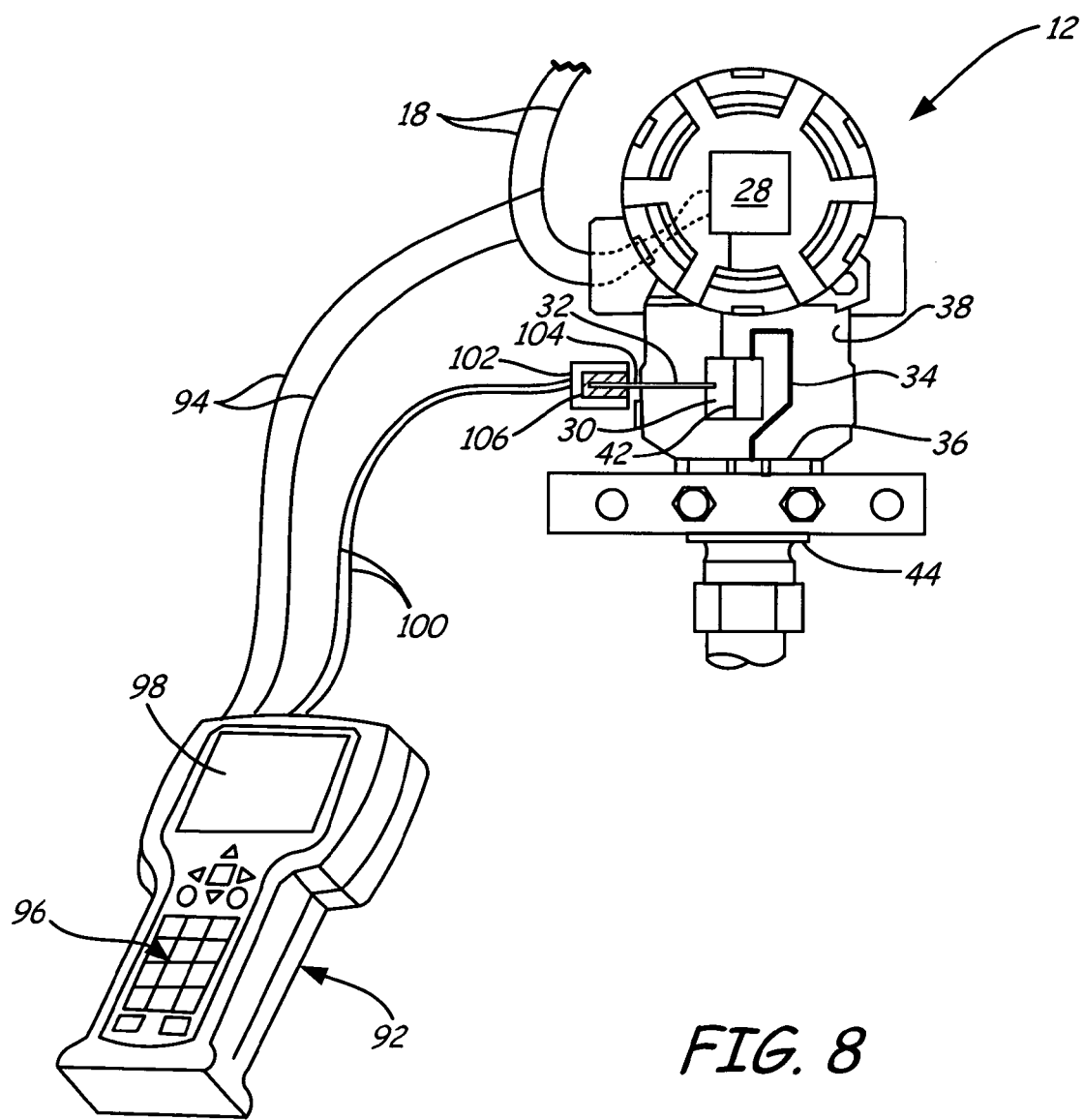
FIG. 8 shows a handheld interrogator configured to deliver heat to the process transmitter of FIG. 1.

FIG. 8 shows handheld interrogator 92 configured to deliver heating to process transmitter 12. In the embodiment shown, interrogator 92 includes similar components as described with respect to FIG. 7. However, power cable 100 includes heating sleeve 102, which connects to reference tube 32. In the embodiment of FIG. 8, reference tube 32 includes segment 104 that extends from transmitter housing 38 to accept sleeve 102. Segment 104 can be integrated with tube 32 or can comprise an extension that connects to tube 32 to receive sleeve 102. Heating sleeve 102 performs a similar heating function as that of heating device 46. Heating sleeve 102 comprises an annular or tubular structure that includes a heating element that applies heat to reference tube 32 to cause a pressure pulse. In one embodiment, sleeve 102 includes coil winding 106 disposed on the interior of sleeve 102 to fit around tube 32 and to connect to power cable 100. Current from interrogator 92 is delivered to coil winding 106 to cause resistive heating of tube 32.

Other excitation sources can be used to produce the pressure pulse other than with heating devices. For example, a volume of pressurized air can be introduced into reference tube 32 to produce a transient pressure pulse. In one embodiment, a manually controlled pressure pulse is produced using a pressure bulb, as is described with respect to FIG. 9. In another embodiment, a machine controlled pressure pulse is produced using, for example, a calibrated pressure pump, as is described with respect to FIG. 10.

FIG. 9 shows a schematic of process transmitter 12 in which pressure producing means 40 comprises pressure bulb 108. Pressure bulb 108 includes a flexible body, diaphragm, bladder, globe or the like that can be flexed to push a volume of air into reference tube 32. In the embodiment shown, pressure bulb 108 comprises disk 110, bulb 112, threaded collar 114, through-bore 116, vent-hole 118 and seal 120. In other embodiments, pressure bulb 108 can simply comprise a device similar to a turkey baster, an eye dropper or the like that can be attached to the opening of reference tube 32.

In the embodiment shown, plug 48 is recessed into reference tube 32 and the outlet end of tube 32 is threaded to receive pressure bulb 108. Specifically, threaded collar 114 is threaded into tube 32. In other embodiments, collar 114 can be press fit or force fit into tube 32 or connected by any other suitable, permanent or semi-permanent, air tight means. Seal 120, which comprises an O-ring, is positioned around threaded collar 114. Bulb 108 is threaded into reference tube 32 such that disk 110 forces seal 120 against transmitter housing 38. Through-bore 116 extends through disk 110 and collar 114 to connect the interior of reference tube 32 with atmospheric pressure. Bulb 112 is attached to disk 110 in any suitable manner so as to form an air tight seal. Bulb 112 includes vent-hole 118 to open the interior of bulb 112 to atmospheric pressure. As such, when pressure bulb 108 is not in use, reference tube 32 is properly vented such that pressure sensor 30 provides gauge pressures.

Pressure bulb 108 is operated to produce a transient pressure pulse within reference tube 32. A finger of an operator is positioned over vent-hole 118 to deform bulb 112. The finger seals vent-hole 118 such that air within bulb 112 is forced into collar 114 and into tube 32. The volume of pressure bulb 108 is many times the volume of reference tube 32 such that a large pressure increase can be generated. Seal 120 prevents air from leaking out to the atmosphere. The air is forced past plug 48, which is recessed into tube 32 and prevents debris from entering tube 32. In other embodiments, plug 48 can be removed from tube 32 altogether as pressure bulb 108 provides a means for inhibiting debris from entering tube 32.

Depression of bulb 112 produces an increase in pressure within reference tube 32 that is transmitted to flexible sensor element 42 of sensor 30. In other embodiments, pressure bulb 108 can be operated in reverse, so as to draw air from reference tube 32, to produce a negative pressure (or vacuum) within reference tube 32. Thus, a pressure bulb can be used to produce a positive or negative pressure change in reference tube 32 to cause a deflection of sensing element 42. Thus, the performance of sensor 30 can be directly observed by operation of pressure bulb 108 using a local LCD display or the like to monitor transmitter output. More accurate results can be obtained by using a source of regulated pressurized air.

FIG. 10 shows a schematic of process transmitter 12 in which pressure producing means 40 comprises calibrated pressure pump 124. Pressure pump 124, which is connected to reference tube 32 by hose 126, includes pressure piston 128, actuator 130 and pressure gauge 132. Pressure pump 124 operates similarly as pressure bulb 108 of FIG. 9 to increase the pressure within reference tube 32. Pressure pump 124, however, enables a measured increase of the pressure such that the reaction of pressure sensor 30 can be more accurately assessed.

Hose 126 is connected to the outlet of pressure piston 128 and the inlet of reference tube 32. Tube 126 can simply be slipped onto the tip of pressure piston 128 and slipped into or over reference tube 32. Tube 126, however, can be affixed by more secure means such as by using threaded couplers or hose clamps. An operator triggers actuator 130 to move pressure piston 128 within the housing of pump 124. Piston 128 forces air from within the housing of pump 124 into hose 126 and into reference tube 32. The pressurized air is applied to flexible sensor diaphragm 42 within pressure sensor 30. Pressure gauge 132 provides an accurate indication of the applied pressure. Pressure gauge 132 comprises a digital or analog meter that includes a display, such as a dial or LCD, for visually indicating to an operator an accurate level of the pressure level generated within reference tube 32.

In other embodiments, other sources of measured pressure sources can be used. For example, any type of pump, such as positive displacement pumps or roto-dynamic pumps, can be used in place of pressure piston 128. Additionally, a conventional dead weight tester can be connected to reference tube 32 to produce a calibrated pressure pulse. Reference tube 32 can also be connected to a source of shop air on a factory floor. In such an embodiment, reference tube 32 can be connected to a high pressure source of air (e.g. ~1000 psi [~6.9 MPa]) using a regulator to step down the pressure (e.g. ~10 psi [~69 kPa]) and an automated valve which either vents the pressurized air or directs the pressurized air into reference tube 32. The regulator produces a known pressure that can be used to perform diagnostics. For example, the performance of sensor 30 can be performed manually by monitoring a change in pressure sensed by transmitter 12, as is displayed on a local display, in response to an applied calibrated pressure. Specifically, there should be a one-to-one relationship between the pressure input from pressure pump 124 and the pressure output of transmitter 12. However, more sophisticated analysis can be performed using transmitter circuitry 28 and control room 14.

Experimental data has verified that a pressure input into a dry, sealed reference tube has resulted in changes in the sensed pressure. Heat energy was supplied to the test reference tube using an external heating source, such as a resistive heating device similar to that of devices 46 (FIG. 2). Incremental power inputs were provided to the heating device to heat the reference tube. Specifically, 1 Watt, 2 Watts, 5 Watts and 10 Watts were applied to the device for 10 seconds each. The temperature within the test tube was raised to approximately 122° F. (~50° C.) at 5 Watts. Much of the energy dissipated into heating the tube itself; however a pressure reading of approximately 0.18 psi (~1.24 kPa) was obtained. The pressure reading nearly doubled by increasing the heat input to 10 Watts. Thus, a generally linear relationship was observed between heat input and pressure output.

The experimental data confirms that the pressure sensor responds to an excitation source that generates a pressure within the reference tube. By knowing the relationship between the input (such as heat input, power input or pressure input), and the output (pressure sensor output), various aspects of transmitter 12 and sensor 30 can be diagnosed. For example, such relationships can be used to verify calibration of the pressure sensor, as discussed with reference to FIGS. 11 and 12. The actual change in pressure indicated by the pressure sensor can be compared to an expected result to diagnose potential problems within pressure transmitter 12; as is discussed with reference to FIGS. 13A-13D.

Figure 11:
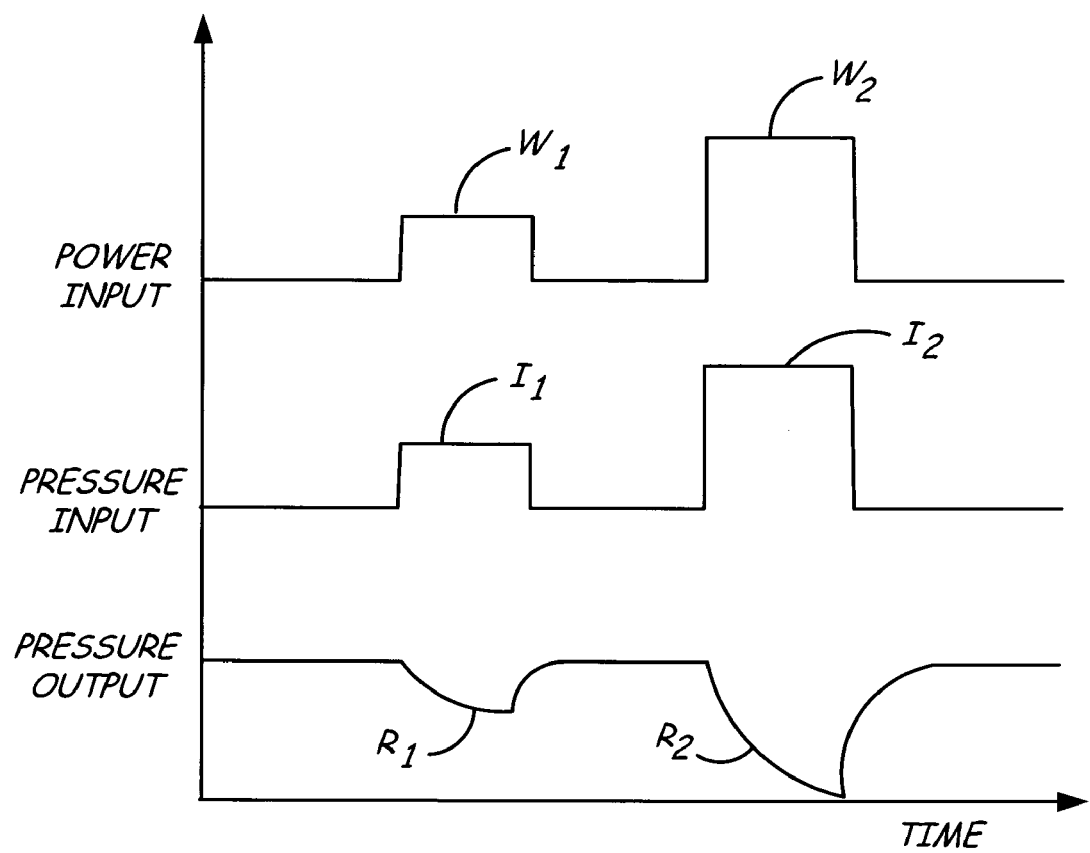
FIG. 11 shows a graph illustrating a method for verifying calibration of a pressure sensor.

FIG. 11 shows a graph illustrating a process for verifying calibration of a pressure sensor. FIG. 11 displays a series of excitation source inputs and pressure inputs into a pressure sensor and a corresponding series of increases in a pressure signal output. For example, power wattage inputs $W_1$ and $W_2$ are applied to heating devices within a pressure sensor module to produce pressure inputs $I_1$ and $I_2$. Wattage inputs $W_1$ and $W_2$, through pressure inputs $I_1$ and $I_2$, induce pressure responses $R_1$ and $R_2$ in a pressure signal output of the pressure sensor module. Pressure inputs $I_1$ and $I_2$ can, however, be from any source, such as pressure pumps, rather than thermal inputs.

Because of the known relationship between excitation source inputs and pressure signal output for the pressure pulse diagnostic system of the present invention, the change in magnitude of the resulting pressure signal responses $R_1$ and $R_2$ should correspond to the change in magnitude of pressure inputs $I_1$ and $I_2$. As was discussed above, the change in magnitudes of pressure signal responses $R_1$ and $R_2$ changes linearly with change in magnitudes of wattage inputs $W_1$ and $W_2$ for embodiments of the invention using thermal inputs as the excitation source. The magnitudes of wattage inputs $W_1$ and $W_2$ are known based on, for example, the magnitude of the resistors in the heating device and the magnitude of the current supplied to the resistors. Thus, by applying a series of excitation source inputs the resulting pressure signal responses can be compared to an expected pressure response curve to verify that the pressure sensor is properly calibrated. If the pressure signal responses do not fit the expected relationship or curve, it is an indication that the pressure sensor is out of calibration.

An even simpler analysis can be performed using known pressure impulses, such as with calibrated pressure pump 124. The magnitude of the known pressure input should be approximately equal to the pressure sensor output. For example, to check calibration of sensor 30, the pressure in reference tube 32 is changed a known amount and the output of transmitter 12 should reflect the same change. If transmitter 12 is calibrated 0 to 30 psig [pounds per square inch gauge] (~207 kPa), and a 20 psig (~138 kPa) pressure is applied to isolation tube 34, such as through process connection 22, the output of transmitter 12 should indicate 20 psig (~138 kPa). If 5 psig is now applied to reference tube 32, the transmitter output should change to 15 psig (~103 kPa). If a −5 psig (~34 kPa) vacuum is now applied to reference tube 32, the transmitter output should change to 25 psig (~172 kPa). The precision of the calibration check is directly correlated to the precision of the applied reference pressure. If 0 psig is applied to isolation tube 34, (i.e. isolation tube 34 is vented to atmosphere) the output of transmitter 12 should indicate 0 psig. In this case only a vacuum can be applied to check calibration. If a −10 psig (~69 kPa) vacuum is now applied to reference tube 32, the transmitter output should change to 10 psig (~10 kPa). The applied vacuum is limited to 14.7 psi (~101.4 kPa). Thus, only a single pressure input can be used to calibrate pressure sensor 30. Transmitter 12 can be configured to perform calibration diagnosing routines to provide users with an indication of sensor health.

Figure 12:
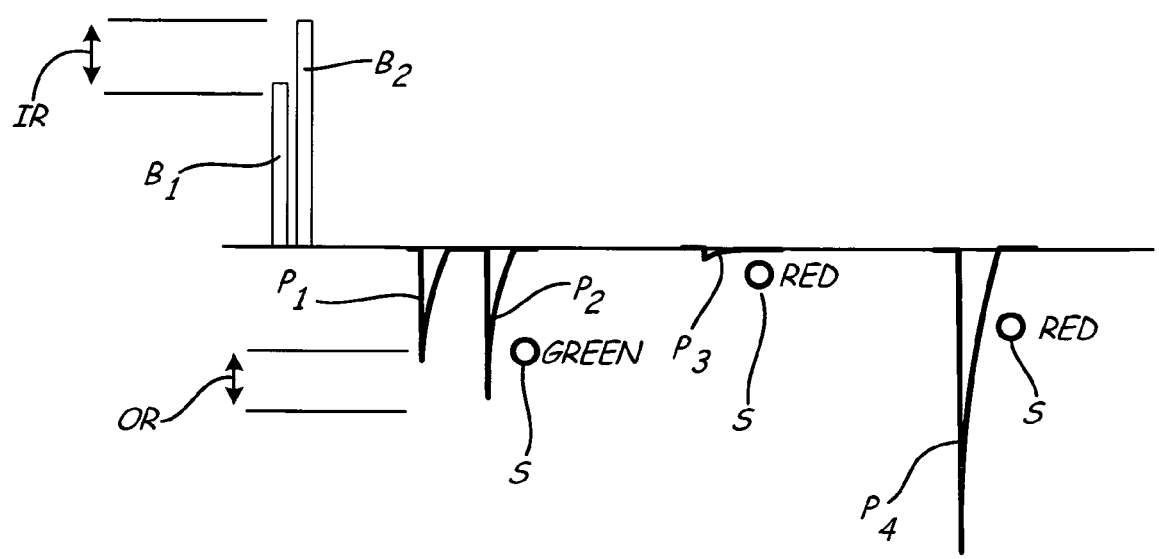
FIG. 12 shows a graph illustrating a method for verifying operation of a pressure sensor.

FIG. 12 shows a graph illustrating a method for monitoring diagnostics administered using the techniques of the present invention. For such a method, transmitter 12 is outfitted with an output display, such as an LED indicator or LCD screen, connected to transmitter electronics 28 that produces a diagnostic signal S. Bars $B_1$ and $B_2$ represent two pressure pulse inputs indicating the low end and top end of pressures pulses that pressure generating means 40 is capable of producing. Pulses $P_1$ and $P_2$ represent pressure outputs for pressure inputs of bars $B_1$ and $B_2$ of a properly working pressure sensor 30. Pulses $P_1$ and $P_2$ produce output range OR. Pressure outputs $P_3$ and $P_4$ show outputs for an improperly functioning sensor 30.

For pressure producing means 40, such as pressure bulb 108, the magnitudes of the expected pressure pulses that can be generated with such means can be determined. For example, depending on with how much force an operator depresses bulb 112, pressure bulb 108 (FIG. 9) produces different pressures. Input rage IR represents the most likely range of pressures that an operator will produce by depressing bulb 112. For such pressure inputs, transmitter electronics 28 can be programmed with expected pressure outputs from sensor 30. As such, for every activation of pressure producing means 40 the pressure output of sensor 30 should fall within output range OR. If the pressure output generated during a test operation is within output range OR, the output display will indicate a positive signal S. For example, in the embodiment shown, an LED indicator can indicate a green color to show that, within a given confidence interval, pressure sensor 30 is operating to satisfaction. If the output pressure pulse falls below or above the output range OR, such as $P_3$ or $P_4$, the output display can indicate a negative signal S. For example, an LED indicator can indicate a red color to show that the pressure output of sensor 30 is not within an expected confidence interval. As such, a quick indication of the performance of sensor 30 can be inexpensively obtained. More accurate and detailed diagnostics of pressure sensor 30 can be performed by more directly correlating pressure input and output magnitudes.

Figure 13A:
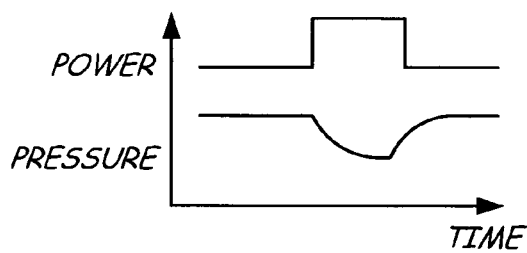
FIGS. 13A through 13D show various graphs of pressure sensor output in response to excitation source inputs that correspond to various diagnoses of pressure sensor operation.

FIGS. 13A-13D show various graphs of pressure signal output corresponding to various diagnoses of the health of pressure sensor 30. Each figure displays the power input and corresponding pressure output from the pressure sensor. Although FIGS. 13A-13D are described with respect to heating devices, other excitation sources, such as calibrated pressure testers, can be used to perform the diagnoses. FIG. 13A indicates a pressure sensor signal in response to a power input to a heating device for a properly functioning pressure sensor. A constant power pulse is provided to a heating device for a limited amount of time. The power to the heating device dissipates as heat expands the air within reference tube 32, causing an increase in pressure of the air as the temperature rises. The pressurized air exerts an increasing pressure on the flexible sensor element on the opposite side as does pressure from isolation tube 34, resulting in a negative pressure signal. When the power input is stopped the pressure signal returns to the baseline pressure as the thermal energy within the air dissipates. The pressure decays according to both thermal and volumetric decay rates. The pressure signal produces as sawtooth shaped signal indicating an increase and decay of the pressure experienced at the sensing diaphragm, thus indicating a properly functioning sensor.

Figure 13B:
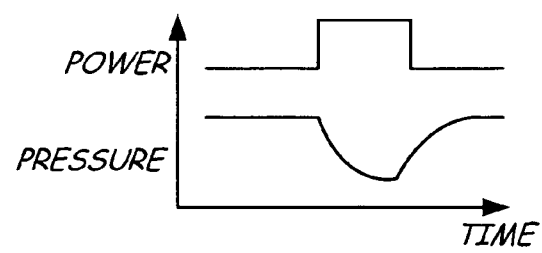

FIG. 13B indicates a pressure sensor signal in response to a power input to a heating device for a pressure sensor having a plugged gauge reference tube. Sometimes, a contaminant builds up within reference tube 32. For example, environmental contaminants or elements such as water may become lodged within reference tube 32, inhibiting the ability of reference tube 32 to vent to the atmosphere. Thus, heated atmospheric air within reference tube 32 will not have room to expand or escape, causing a greater increase in $P_A$ than expected. As such, air heating under a thermal input will deflect flexible sensor element 42 a greater amount than as if the obstruction were not there. Thus, all of the pressure buildup from the air heating will be transmitted to the sensor diaphragm. The pressure signal will therefore rise to a level much larger than what the corresponding power input would normally cause the signal to rise to, such as in FIG. 13A. The rate at which the saw-tooth signal decays would also become elongated, as compared to the signal of FIG. 13A, as the pressure increase will decay as a result of only thermal dissipation (as the system returns to thermal equilibrium), rather than thermal dissipation and volumetric expansion (as the system returns to pressure equilibrium) as would normally occur if tube 32 were open. Thus, a saw-tooth signal having a greater magnitude and lengthier decay than expected may be indicative of an obstructed reference tube. When using an external pressure source the obstruction prevents pressure from reaching the sensor. In this case the response would be similar to FIG. 13D.

Figure 13C:
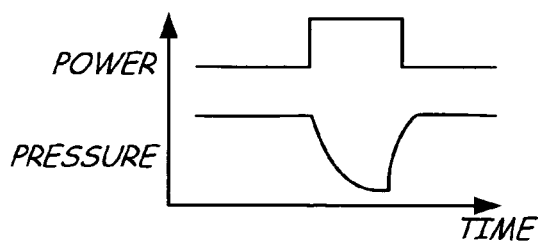

FIG. 13C indicates a pressure sensor signal in response to a power input to a heating device for a pressure sensor having a low fill fluid volume. Sometimes, it is possible for fill fluid to leak out of the sensing system. For example, fill fluid might leak from isolation tube 34 after a seal along isolation diaphragm 36 fails. As such, air expanding under a thermal input in reference tube 32 will be free to expand as flexible sensor element 42 will have no back pressure from isolation tube 34. Similarly, if the hydraulic system contained entrapped gas, the air would compress under the increased pressure of the expanding fill fluid. The pressure sensor signal will increase greater than what would be expected for a properly functioning system. Thus, a greater-than-expected output in response to a pulsed power input to a heating device may be indicative of a hydraulic system having low oil or the presence of gas Such a signal profile, however, would differ from the scenario of a plugged or water filled reference tube of FIG. 13B. For example, the magnitude of the signal may be greater than the former case, as the lack of a back pressure would facilitate easier movement of flexible sensor element 42 than would having to pressurize tube 32 via heating. Likewise, the decay of the signal would have a different profile than the former case. Specifically, the pressure increase within reference tube 32 will decay as a result of only volumetric expansion, rather than volumetric expansion and thermal dissipation. The volumetric expansion is time dependent and the thermal dissipation is heat dependent. It takes longer for heat to dissipate than for pressure to escape reference tube 32. Thus, with reference tube unobstructed, the rate at which the signal decays for a sensor will low fill fluid will be faster than for a plugged reference tube and the resulting pressure decay would be truncated as compared to FIG. 13A.

Such a signal profile may also be indicative of a fill fluid that has become permeated with a gas from ambient or process conditions. Sometimes, pressure transmitters are integrated into process control systems for which they were not originally intended. Isolation diaphragms are selected based on the types of process fluids they will contact when installed. For example, isolation diaphragms having gold plating are used when the process fluid is known to include hydrogen gas. Hydrogen gas is able to permeate typical steel isolation diaphragms. Steel isolation diaphragms contacting process fluids containing a hydrogen gas component will draw the hydrogen gas through the isolation diaphragm where it is absorbed by the fill fluid. Due to the hydrogen gas in the fill fluid within the isolation tube, the isolation diaphragms begin to bow outward. As the air within reference tube 32 is heated from the heating devices, the hydrogen gas within the fill fluid becomes compressed through flexible sensor element 42. Because of the hydrogen gas, the sensing diaphragm detects smaller back pressure and responds similarly as with the presence of gas within the fill fluid.

Figure 13D:
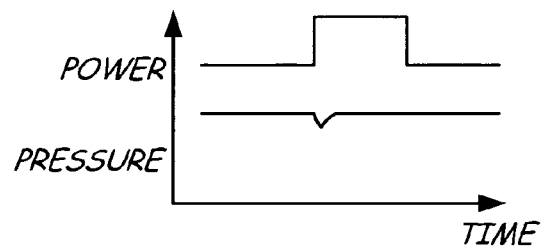

FIG. 13D indicates a pressure sensor signal in response to a power input to a heating device for a pressure transmitter having a plugged impulse line or a caked isolator. Sometimes, the process fluid or some other contaminant builds up within the system. For example, an impulse pipe, typically a small diameter conduit such as connection 22, connecting a process fluid pipeline to a pressure transmitter flange may become plugged with oil or some other sludge. Alternatively, ice may accumulate in the system to block a passage. Thus, pressure $P_1$ from the process fluid is prevented from being transmitted to the pressure transmitter. As such, air being pressurized under a thermal input will not deflect the sensor diaphragm as much or at all as the isolation diaphragm is prevented from moving by the plug or obstruction. For a partially plugged line the pressure signal may begin to rise, but will peak below what the corresponding expected value shown in FIG. 13A. Thus, a saw-tooth signal having a magnitude smaller than expected may be indicative of a plugged connection or caked isolator.

Operation of heating devices 46, 62 and 72 can be controlled either manually on demand, or automatically as needed to execute the verification process discussed with reference to FIGS. 11-13D. In one embodiment, heating devices 46, 62 and 72 are activated locally by a user through an interface such as local operator interface (LOI) provided on circuitry 28 to run the verification process, or through a handheld interrogator device. Once a diagnostic test is initiated, a user need not perform any subsequent tasks, preventing improper operation of the heating devices and facilitating ease of use. For example, activation of heating devices 46, 62 and 72 for too long a period can lead to unintended consequences. Producing too much heat within sensor housing 38 may cause degraded accuracy of sensor 30 by introducing temperature gradients within the sensor system. In other embodiments, initiation of heating devices 46, 62 and 72 is activated automatically by control room 14 remotely through control loop 18. After the verification process is completed by circuitry 28, results are communicated to an operator in the form of an audible annunciation or a visual cue, such as over control loop 18 (FIG. 1) or through a local display on circuitry 28.

Transmitter circuitry 28 includes software that coordinates operation of sensor 30 to sense a process pressure and operation of heating devices 46, 62 or 72 to verify operation of sensor 30. The verification process may run as a real time background operation during the course of routine functioning of transmitter 12, or may run as the primary function of transmitter 12 while offline, depending on how power is delivered to the heating devices and the routine used to activate the devices and other factors. For example, in one embodiment, power can be delivered to the heating devices through a supercapacitor that is charged through trickle current delivered from circuitry 28 or a battery such that transmitter 12 need not be taken offline. As such, the diagnostics and verification can occur automatically at the initiation of circuitry 28. In other embodiments, transmitter 12 is taken offline and power is temporarily delivered to the heating devices or a capacitor, and the diagnostics and verification process can be initiated and conducted manually by an operator.

Transmitter circuitry 28 (FIG. 1) includes software routines that perform the various operations involved in performing the verification and diagnostic procedures. For example, transmitter circuitry 28 activates the heating devices, verifies operation of the heating devices with sensor 52 (FIG. 2), verifies output of sensor 30 in response to activation of the heating devices, and compares the output of sensor 30 with the output of sensor 52. To further enhance the reliability of the diagnostics, temperature sensor 52 is used to monitor output and operation of the heating devices and to compensate the pressure signal for temperature errors or variations resulting from changes in ambient temperature. Comparison of the pressure sensor signal can be verified before temperature compensation occurs. For example, the thermal input from heating devices 46, 62 or 72 will cause an increase in the pressure signal before sensor 52 detects an increase in temperature within sensor housing 38. Thus, temperature sensor 52 and the known power pulse input to the heating device can be used to derive the verification of sensor 30 before circuitry 28 begins to compensate the pressure signal based on input from sensor 52.

Transmitter 12 also includes software for enhancing utility of data generated by the pressure pulse diagnostic system and for ensuring compliance of transmitter 12 with industry standards. In one embodiment of the invention, transmitter circuitry 28 includes asset management software to produce, record and store data relating to diagnostic signals produced as a result of the thermal-based diagnostic system such that shifts in transmitter performance can be monitored. To reduce bandwidth consumption over control loop 18, discrete packages of data relating to performance shifts or asymmetrical performance of sensor 30 can be communicated to control room 14 rather than continuous streams of information. For example, the asset management software can store and transmit patterns in signal magnitude, time constant, wave shapes, or wave symmetry. These and other verification processes conducted by transmitter 12 are compatible with digital control systems that integrate Safety Instrumented System (SIS) and Safe Failure Fraction (SFF) protocols to verify that transmitter 12 produces a recognizable signal when the transmitter fails to ensure that operators of control system 10 are aware of the operating state of transmitter 12.

The thermal-based sensor diagnostic system of the present invention provides a simple, reliable and accurate method for verifying both the operation and calibration of sensor 30. Operation of sensor 30 is verified by simply inducing a change in the pressure signal with a heat pulse from one of devices 46, 62, 72 or 92; a pressure pulse from devices 108 or 124; or a similar device. Conversely, the response pressure signals can be used to verify operation of the verification system itself. Comparison of the magnitude of a series of heat pulses from devices 46, 62, 72 or 92, or pressure pulses from devices 108 or 124 to the changes in magnitude of the pressure signal are used to evaluate the calibration of sensor 30, such as discussed with respect to FIGS. 11 and 12. Furthermore, advanced diagnoses can be performed to determine 1) if the pressure sensor is operating correctly, 2) if the pressure sensor is calibrated, 3) if the external pressure connection is plugged, and 4) if the pressure sensor is damaged due to ruptured diaphragms, low oil, air within the oil, etc., such as discussed with respect to FIGS. 13A-13D.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process transmitter for measuring a process variable, the process transmitter comprising:
   a gauge pressure sensor that measures a physical pressure difference between a process fluid and a reference volume, and that generates an electrical pressure sensor signal representing the physical pressure difference;
   an excitation source for generating a physical pressure pulse within the reference volume to change the physical pressure difference and influence generation of the electrical pressure sensor signal; and
   transmitter circuitry connected to the gauge pressure sensor to provide an output related to a change in the electrical pressure sensor signal due to the physical pressure pulse.

2. The process transmitter of claim 1 and further comprising:
   a flexible sensor element disposed within the gauge pressure sensor, a position of which corresponds to a magnitude of the electrical pressure sensor signal;
   wherein the pressure pulse deflects the flexible sensor element.

3. The process transmitter of claim 2 wherein the transmitter circuitry generates a diagnostic signal by comparing the output to the physical pressure pulse.

4. The process transmitter of claim 2 wherein the excitation source is connected to the transmitter circuitry such that the transmitter circuitry operates the excitation source.

5. The process transmitter of claim 2 wherein the excitation source increases or decreases pressure within the reference volume.

6. The process transmitter of claim 2 wherein the reference volume comprises a fixed volume in an enclosed area.

7. The process transmitter of claim 2 wherein the reference volume is open to atmospheric pressure.

8. The process transmitter of claim 2 and further comprising:
   a housing containing the gauge pressure sensor and the transmitter circuitry; and
   a reference tube comprising the reference volume and connecting the flexible sensor element with ambient pressure outside of the housing, wherein the excitation source is connected to the reference tube.

9. The process transmitter of claim 8 wherein the excitation source comprises a source of pressurized air.

10. The process transmitter of claim 9 wherein the excitation source comprises a pressure bulb connected to an inlet of the reference tube.

11. The process transmitter of claim 10 wherein the pressure bulb comprises:
    a flexible enclosure being deformable to move air into or out of the reference tube and increase or decrease pressure therein;
    a collar having a first end for insertion into the reference tube and a second end for receiving the flexible enclosure; and
    a vent-hole in the flexible enclosure to open the reference tube to atmospheric pressure.

12. The process transmitter of claim 9 wherein the excitation source comprises a calibrated pressure source connected to an inlet of the reference tube.

13. The process transmitter of claim 12 wherein the calibrated pressure source comprises:
- a piston and cylinder pressure pump configured to push air into or pull air out of the reference tube and increase or decrease pressure therein; and
- a pressure gauge connected to the piston and cylinder to determine a magnitude of pressure within the reference tube.

14. The process transmitter of claim 8 wherein the excitation source comprises a heating device.

15. The process transmitter of claim 14 wherein the reference tube includes a constriction and the heating device is positioned inside the reference tube between the constriction and the flexible sensor element.

16. The process transmitter of claim 15 wherein the constriction comprises a flame quenching crimp of the reference tube.

17. The process transmitter of claim 14 and further comprising a temperature sensor for monitoring output of the heating device.

18. The process transmitter of claim 14 and further comprising a battery for supplying power to the heating device.

19. The process transmitter of claim 14 and further comprising:
- a power generating circuit for supplying power to the heating device, the circuit comprising:
  - a capacitor for storing power to be supplied to the heating device; and
  - a plurality of switches for regulating current flow to the capacitor and the heating device.

20. The process transmitter of claim 14 and further comprising:
- a handheld interrogator for communicating with the transmitter electronics and providing power to the heating device.

21. The process transmitter of claim 20 wherein the handheld interrogator further comprises:
- a heating sleeve comprising the heating device, the heating sleeve being connected to the reference tube.

22. A method for diagnosing performance of a gauge pressure sensor in an industrial process transmitter, the method comprising:
- sensing a pressure differential between a reference volume and a process fluid using a gauge pressure sensor;
- applying an excitation source to the reference volume of the gauge pressure sensor;
- generating a pressure pulse within the reference volume using the excitation source;
- transmitting the pressure pulse to a flexible sensor element in the gauge pressure sensor to change the pressure differential;
- monitoring a sensor output of the gauge pressure sensor in response to the pressure pulse; and
- diagnosing performance of the gauge pressure sensor based on the sensor output and the pressure pulse.

23. The method of claim 22 and further comprising comparing an input or an output of the excitation source with a magnitude of the sensor output.

24. The method of claim 23 wherein the step of diagnosing performance of the gauge pressure sensor comprises checking calibration of the gauge pressure sensor.

25. The method of claim 23 wherein the excitation source comprises a source of pressurized air and the pressure pulse is generated by increasing mass of gas in the reference volume.

26. The method of claim 25 wherein the source of pressurized air is known within a range and further comprising comparing the known range of the pressure pulse with the sensor output.

27. The method of claim 23 wherein the excitation source comprises a heating element and the pressure pulse is generated by expanding a volume of gas within the reference tube by increasing a temperature of the volume of gas.

28. The method of claim 27 and further comprising monitoring output of the heating element with a temperature sensor.

29. The method of claim 27 and further comprising inhibiting flow of expanded gas through the reference volume and minimizing a volume of the expanded gas within the reference volume by positioning a constriction in the reference volume.

30. The method of claim 23 and further comprising generating a diagnostic signal based on a comparison of the sensor output with either an input or an output of the excitation source.

31. The method of claim 30 and further comprising communicating the diagnostic signal over a control loop connected to circuitry within the transmitter.

32. The method of claim 30 and further comprising displaying a visual indication of the diagnostic signal at the transmitter.

33. The method of claim 30 wherein the diagnostic signal is compared to predetermined data stored in the transmitter.

34. The method of claim 30 and further comprising diagnosing a deficiency of fill fluid in an isolation tube, air in a fill fluid, a hydrogen permeated isolation diaphragm, or a ruptured isolation diaphragm after determining the sensor output in response to the pressure pulse is larger than the pressure pulse and truncated.

35. The method of claim 30 and further comprising diagnosing a plugged process connection after determining the sensor output is absent of negligible in response to the pressure pulse.

36. The method of claim 30 and further comprising diagnosing a plugged gauge reference volume after determining the sensor output in response to the pressure pulse is larger than the pressure pulse and elongated.

37. The method of claim 22 wherein the excitation source is applied as a background operation while online with a control loop.

38. The method of claim 22 wherein the excitation source is applied as a primary operation while offline with a control loop.

39. The method of claim 22 wherein the excitation source is applied to the reference volume using a hand held interrogator device.

* * * * *